United States Patent [19]
Gower

[11] 3,752,205
[45] Aug. 14, 1973

[54] CHAIN ASSEMBLY FOR IMPROVING TRACTION OF AUTOMOTIVE VEHICLES

[76] Inventor: Roger L. Gower, Room 302, 1911 Jefferson Davis Hwy., Arlington, Va. 22202

[22] Filed: Apr. 12, 1971

[21] Appl. No.: 133,283

[52] U.S. Cl. ............................................. 152/243
[51] Int. Cl. ......................................... B60c 27/00
[58] Field of Search.................. 152/243, 239, 231, 152/232; 59/92

[56] References Cited
UNITED STATES PATENTS

| | | | |
|---|---|---|---|
| 1,615,752 | 1/1927 | Gaiser | 152/239 |
| 3,282,318 | 11/1966 | Nylund | 152/243 |
| 2,465,659 | 3/1949 | Parker | 152/243 |
| 1,163,619 | 12/1915 | Lashar | 152/243 |
| 2,583,155 | 1/1952 | Parker | 152/231 |

*Primary Examiner*—James B. Marbert
*Assistant Examiner*—John Mannix

[57] ABSTRACT

This invention comprises longitudinal and transverse lengths of chain fitted over the tread portion of an inflated tire. The links of chain forming the longitudinal portions of the assembly are bent out of plane in one direction, and the links forming the transverse portions are bent out of plane in the opposite direction. The opposite distortion of the links in the longitudinal and transverse chains ensures disposition of the chain flat upon the tire tread when said chains are assembled in perpendicular relationship to each other, and thus the traction side of the chain links is at all times in equal elevation above the surface of the tire tread. When lugs are attached upon the links, each lug projects from the face of the link which is disposed outwardly from the tread surface of the tire, and each lug is likewise equally engageable with the surface of the terrain over which the vehicle is travelling. Said longitudinal and transverse chains are assembled into units, and such units are connected to each other and to the side chains, to effect complete encirclement of the tire.

2 Claims, 11 Drawing Figures

Patented Aug. 14, 1973

INVENTOR
ROGER L. GOWER

Patented Aug. 14, 1973  3,752,205
3 Sheets-Sheet 2
FIG. 7
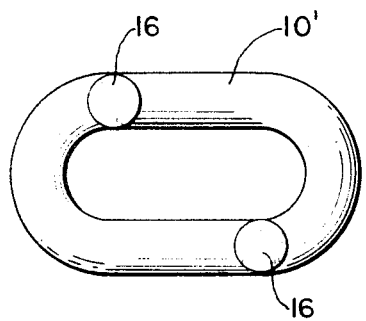
FIG. 8
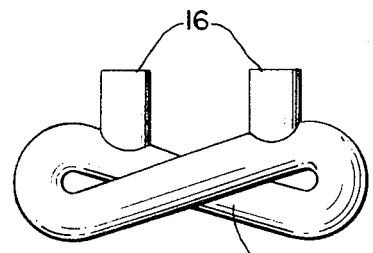
FIG. 9
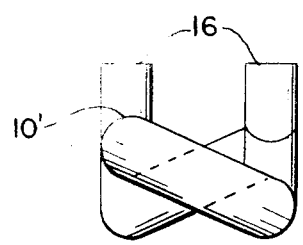
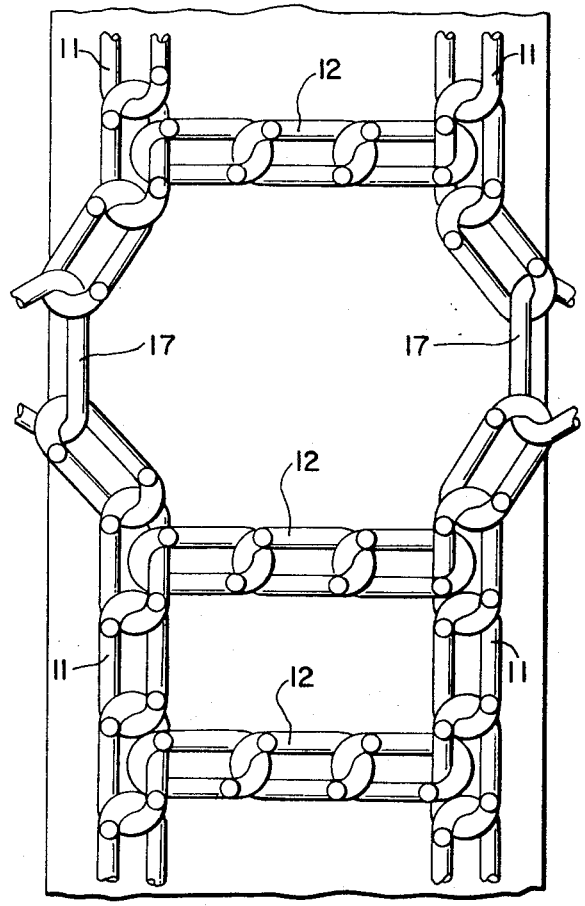
FIG. 10
INVENTOR
ROGER L. GOWER

CHAIN ASSEMBLY FOR IMPROVING TRACTION OF AUTOMOTIVE VEHICLES

The present invention is a unit assembly, used in multiples of sufficient number to surround a vehicle tire circumferentially when mounted upon the tread surface thereof.

Each unit assembly comprises a pair of chains disposed in parallel relationship and another pair of chains, likewise parallel to each other, connected perpendicularly to the first such pair by attachment of the ends of the latter chains to links of the first such pair of chains. For convenience of identification herein, the chains first mentioned are herein referred to as the longitudinal chains, and the chains connected perpendicularly thereto are herein called the transverse chains.

When assembled, the longitudinal chains appear to form the upright lines of a letter H, and the transverse chains form a double cross-bar of such letter.

This invention is not to be confused with twist link chain, wherein no portion of the link body defines a straight line.

The links forming these chains are distorted out of plane by bending said links in the end portions, one such pair of chains having the links bent sinistrally, or in a counterclockwise, direction when the link is viewed from the end, and the other such pair of chains having the links bent in a dextral, or clockwise, direction when so viewed. Such distortion is of the order of approximately 45°. The side portions of the links remain straight, but are, by such distortion, brought into non-parallel relationship to each other.

When the links are thus distorted and the chains are placed upon a flat surface, all links will rest upon that surface at points diagonally opposite, that is, each link will rest upon one end of each straight side at the points furthest from each other, the opposite end of each of said straight sides being therefore disposed outwardly from said surface.

At such outwardly disposed point there may be integrally attached a lug member, to provide traction greater than that achieved by the chain links. In this lugged chain, when the links are assembled together, the forward lug on one end and the rearward lug on the contiguous end of the adjacent, interconnected link are disposed in side-by-side position.

The reverse distortion of longitudinal and transverse chains is provided to ensure that the chain will lie flat, eliminating all possibility of rotation of any part thereof when the assemblies are connected together and mounted upon a vehicle tire. Such reverse distortion likewise serves to distribute the stress on all links throughout the chain, thus reducing the danger of breakage thereof.

The side portions of the links are made so as to define a straight line for the further reason that this permits the use of repair links of like configuration, by permitting their installation as connecting links in the event of breakage of any link. Such repair links are disclosed in my patent application titled REPAIR LINK FOR TRACTION CHAIN, being filed concurrently herewith.

In a different embodiment, the longitudinal chains are made in continuous lengths and the transverse chains are attached thereto at spaced intervals. Connection to conventional side chains is made by tag chains having like distortion to that of the transverse chains. Such opposite distortion of the links of longitudinal chains in one direction and the links of the transverse chains and the tag chains in the other direction ensures flat emplacement of the traction structure upon the vehicle tire. As is true of the assembled units described above, the links of chain in this embodiment may be made plain or with traction lugs integrally attached upon the links of the longitudinal and transverse chains.

For a better understanding of the invention, reference is made to the accompanying drawings, in which:

FIG. 3 is an end elevation of a link of such chain having dextral, or clockwise, distortion; while

FIG. 7 is a top plan view of a link of the present invention having integral lugs upon the face thereof;

FIG. 8 is a side elevation of the link of FIG. 7, showing dextral distortion; and FIG. 9 is an end elevation of the link of FIG. 8.

FIG. 10 shows a top plan view of parts of two assemblies connected together and to tag chains (not shown) for attachment of the assemblies to conventional side chains.

Figure 1:
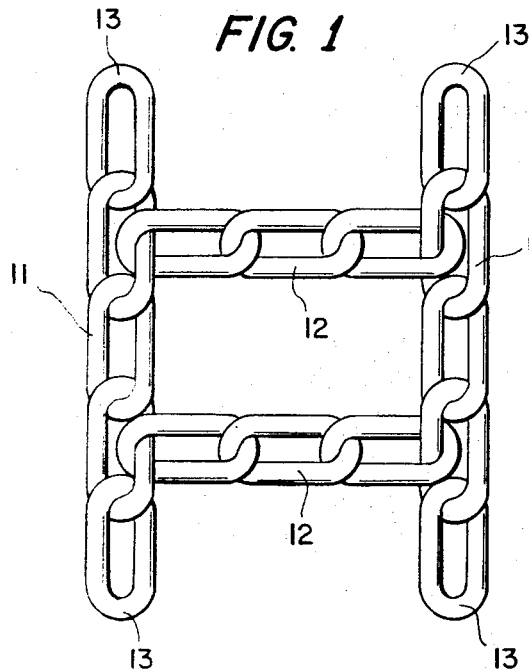
FIG. 1 is a top plan view of a unit assembly of the present invention.

Referring more particularly to the drawings,

In the top plan view of FIG. 1, assembly 10 is shown with longitudinal chains 11, 11 and transverse chains 12, 12. End links 13 are attached by connector means to like end links of adjacent assemblies for mounting upon vehicle tires.

Figure 2:
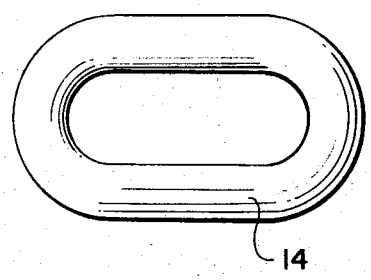
FIG. 2 is a top plan view of a link of such chain.

The top plan view in FIG. 2 shows an elliptical link 14.

Figure 3:
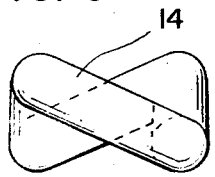
Figure 4:
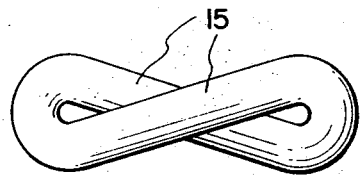
FIG. 4 is a side elevation of the link of FIG. 3.

In the end view of FIG. 3, link 14 is shown having dextral distortion in the end portions, while the side view of FIG. 4 shows the straight sides 15, 15.

Figure 5:
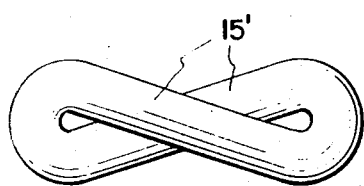
FIG. 5 is a side elevation of a link of such chain, showing sinistral, or counterclockwise, distortion of said link.
Figure 6:
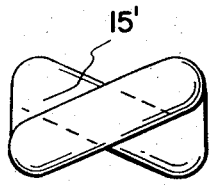
FIG. 6 is an end elevation of the link of FIG. 5.

The side view of FIG. 5 shows sinistral distortion of the ends with straight sides 15', 15' in non-parallel disposition, and the end view of FIG. 6 shows sinistral distortion of the link.

The link 10' of FIG. 7 shows lugs 16, 16 formed integrally upon the face thereof, and in FIG. 8 these lugs are shown elevated from the plane of the link by the dextral distortion of the end portions thereof.

In the end view of FIG. 9, the lugs are shown projecting above the plane of the dextrally distorted link. connected to conventional tag chains (not shown) for attachment to the side chains for mounting upon a vehicle tire. Since such tag chains and side chains are conventional items and are not claimed as a part of this invention, both have been omitted from the drawing.

Figure 11:
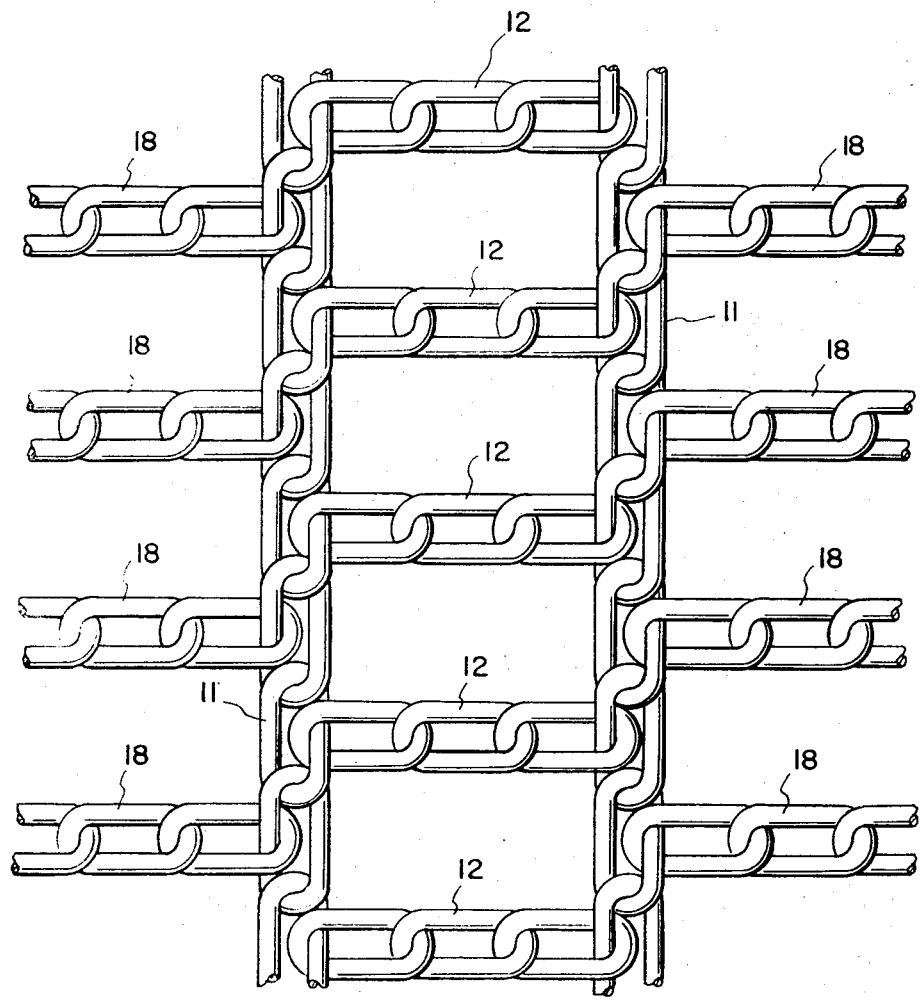
FIG. 11 shows the alternate structure described above, using continuous lengths of longitudinal chain with integral transverse chains therebetween.

FIG. 11 shows the alternate structure described above, using continuous lengths of longitudinal chain. In this Figure the tag chains 18 are shown connected to the longitudinal chains, the links of said tag chains being distorted in the direction opposite to that employed in fabricating the links of the longitudinal chains.

It will be seen that the opposed, or reverse, distortion of the longitudinal and transverse chains prevents their rotation when the chains are mounted on vehicle tires and the vehicle is set in motion. With or without lugs, these opposedly distorted chains will lie flat upon the tire, pull taut and provide traction in snow or mud or upon icy or slippery surfaces. With the lugs, the traction power is increased substantially.

The invention having been thus disclosed, what is claimed is:

1. In a chain assembly for mounting on the tire of a vehicle wheel and comprising parallel longitudinal chains disposable along the outer borders of the tread surface of said tire, and extending between said longitudinal chains, transverse chains having the ends thereof connected to said longitudinal chains, the improvement whereby the links of said longitudinal chains are dextrally distorted and the links of each of said transverse chains are uniformly sinistrally distorted in the end portions thereof and the side bars of each link of said transverse chain remain substantially straight and non-parallel, each link having its reverse side disposable contiguous to the said tire tread and having, on its obverse side, at least one projecting lug integrally connected to said link at the end of a side bar furthermost from said tire tread.

2. The invention of claim 1 wherein each link is provided with a lug at the outermost point of each side bar, on the obverse side of said link, and wherein the lug members most closely disposed in adjacent links are thereby placed in substantially side-by-side relationship when the chain is under tension.

* * * * *